United States Patent
Russell et al.

(10) Patent No.: US 11,376,548 B2
(45) Date of Patent: *Jul. 5, 2022

(54) MEMBRANE PERMEATE RECYCLE PROCESS FOR USE WITH PRESSURE SWING ADSORPTION PROCESSES

(71) Applicant: UOP LLC, Des Plaines, IL (US)

(72) Inventors: Bradley P. Russell, Wheaton, IL (US); Gautam Pandey, Gurugram (IN); David A. Wegerer, Lisle, IL (US); Wim Elseviers, Ghent (BE)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,378

(22) Filed: Sep. 4, 2019

(65) Prior Publication Data
US 2021/0060481 A1 Mar. 4, 2021

(51) Int. Cl.
*B01D 53/22* (2006.01)
*B01D 53/047* (2006.01)
*C10L 3/12* (2006.01)
*C01B 3/56* (2006.01)

(52) U.S. Cl.
CPC ......... *B01D 53/229* (2013.01); *B01D 53/047* (2013.01); *B01D 53/227* (2013.01); *C01B 3/56* (2013.01); *C10L 3/12* (2013.01); *B01D 2256/16* (2013.01); *B01D 2256/24* (2013.01); *B01D 2257/702* (2013.01); *B01D 2259/40054* (2013.01); *C01B 2203/042* (2013.01); *C10L 2290/541* (2013.01); *C10L 2290/548* (2013.01)

(58) Field of Classification Search
None
See application file for complete search history.

(56) References Cited

U.S. PATENT DOCUMENTS

| | | | | |
|---|---|---|---|---|
| 5,753,010 A | * | 5/1998 | Sircar ................. | B01D 53/047 95/105 |
| 2004/0103782 A1 | * | 6/2004 | Wascheck ............ | B01D 53/229 95/50 |
| 2007/0125537 A1 | * | 6/2007 | Lokhandwala ........ | B01D 53/22 166/291 |
| 2010/0129284 A1 | * | 5/2010 | Niitsuma ............. | B01D 53/047 423/437.1 |
| 2018/0111831 A1 | * | 4/2018 | Adamopoulos ...... | B01D 53/229 |

FOREIGN PATENT DOCUMENTS

| | | |
|---|---|---|
| WO | 2007050446 A2 | 5/2007 |
| WO | 2010135185 A1 | 11/2010 |

OTHER PUBLICATIONS

International Search Report and Written Opinion of the International Search Authority dated Nov. 23, 2020.

* cited by examiner

*Primary Examiner* — Jason M Greene
(74) *Attorney, Agent, or Firm* — Paschall & Associates, LLC; James C. Paschall

(57) ABSTRACT

Process of treating a net gas stream is disclosed. The process includes sending the net gas stream to a compressor to produce a compressed gas stream. The compressed gas stream is then sent to a pressure swing adsorption unit to produce a hydrogen product stream and a tail gas stream. Tail gas stream from the pressure swing adsorption unit is sent to a first membrane unit to produce a first permeate stream and a first non-permeate stream. Portion of the tail gas stream is sent to a second membrane unit to produce a second permeate stream and a second non-permeate stream.

18 Claims, 5 Drawing Sheets

MEMBRANE PERMEATE RECYCLE PROCESS FOR USE WITH PRESSURE SWING ADSORPTION PROCESSES

FIELD OF THE INVENTION

The present disclosure relates to a membrane permeate recycle process utilizing hydrogen recovery units and pressure swing adsorption units.

BACKGROUND OF THE INVENTION

Typically, a membrane separation process includes a feed conditioning section that conditions the membrane feed gas by removing liquids, solids and undesired contaminants and then establishes the desired membrane operating temperature. The separation of gases in the membrane separation process is achieved due to the difference in relative permeation rates of hydrogen and other hydrocarbon components when a pressure difference between a feed side and a permeate side of a semi-permeable membrane barrier is present or imposed. Typically, membrane elements contain the semi-permeable membrane barrier.

Conventionally, membrane separation units contain at least two membrane module banks. The membrane module banks of the membrane separation section are arranged in parallel and connect into common piping that typically distributes the membrane feed gas and collects the membrane permeate gas and membrane non-permeate gas streams. The known non-permeate conditioning section contains an automatic control valve that maintains the pressure on the membrane side and can contain additional equipment such as heat exchangers and knock out drums to cool the gas and remove any condensed liquids produced after cooling.

For this reason, at least two membrane module banks are installed in each membrane unit so that a turndown control of 25-100% of the nominal flow rate can be achieved by isolating the individual membrane module banks when feed flow capacity reduces in combination with the stage-cut control on the membrane module banks are in service.

Accordingly, it is desirable that an improved process is provided which would be an enhancement of the existing hydrogen recovery flow scheme associated with a catalytic reformer. A need exists for improvement in membrane separation process for improving the permeate recycle of the gases thereby reducing the operating and capital expenses of the overall membrane separation process and unit. Consequently, an improved pressure swing adsorption unit is required that can be used for refinery off-gas separation where high recovery of hydrogen and LPG is desirable and the downstream consumers are using the product hydrogen at high pressure in processing reactors such as hydroprocessing. Further, there is required a separation process which is dynamic and robust in operation.

Furthermore, other desirable features and characteristics of the present subject matter will become apparent from the subsequent detailed description of the subject matter and the claims, taken in conjunction with the accompanying drawing and this background of the subject matter.

SUMMARY OF THE INVENTION

Various embodiments contemplated herein relate to an improved permeate recycle process which includes a pressure swing adsorption unit and a membrane unit to which a membrane permeate stream is recycled for maximum hydrogen recovery. In accordance with an exemplary embodiment, a process is provided for treating a net gas stream comprising sending the net gas stream to a compressor to produce a compressed gas stream. The compressed net gas stream is sent to a pressure swing adsorption unit to produce a hydrogen product stream and a tail gas stream. The tail gas stream is sent to a first membrane unit to produce a first permeate stream and a first residual stream. A portion of the tail gas stream is further sent to a second membrane unit to produce a second permeate stream and a second residual stream.

In accordance with another exemplary embodiment, a process for treating a net gas stream is provided comprising sending the net gas stream to a compressor for producing a compressed gas stream which is further pass to a pressure swing adsorption unit for recovering hydrogen as a product stream along with a tail gas stream. The process further includes sending the recovered tail gas stream to a first membrane unit for producing a first permeate stream and a first non-permeate stream. The tail gas stream is then sent to a second membrane unit to produce a second permeate stream and a second non-permeate stream followed by controlling the flow of the tail gas stream to the first membrane unit and second membrane unit.

Accordingly, the present disclosure, describes an improved permeate recycle process that reduces operating and capital expenses including the control system requirements to make the system fully flexible and adaptable to changes in system operation. Applicants have found that the instant solution is achieved by adding a second membrane unit that operates at lower pressure as compared to the first membrane unit which reduces the overall size of the membrane unit required for the instant flow scheme. Also, the recycle of the permeate gas from the second membrane unit to the pressure swing adsorption (PSA) unit is kept at low pressure, thereby lowering the operational and capital cost of the recycle operation. Further, the low pressure permeates recycle from the second membrane unit provides purge gas sent to the PSA unit resulting in an increase in the hydrogen recovery from the PSA unit. Accordingly, the current permeates recycle process reduces the operating expenses by about 10% and reduces capital costs by about 7%.

These and other features, aspects, and advantages of the present invention will become better understood upon consideration of the following detailed description, drawings and appended claims.

BRIEF DESCRIPTION OF THE DRAWINGS

The various embodiments will hereinafter be described in conjunction with following figures, wherein like numerals denote like elements.

Figure 1:
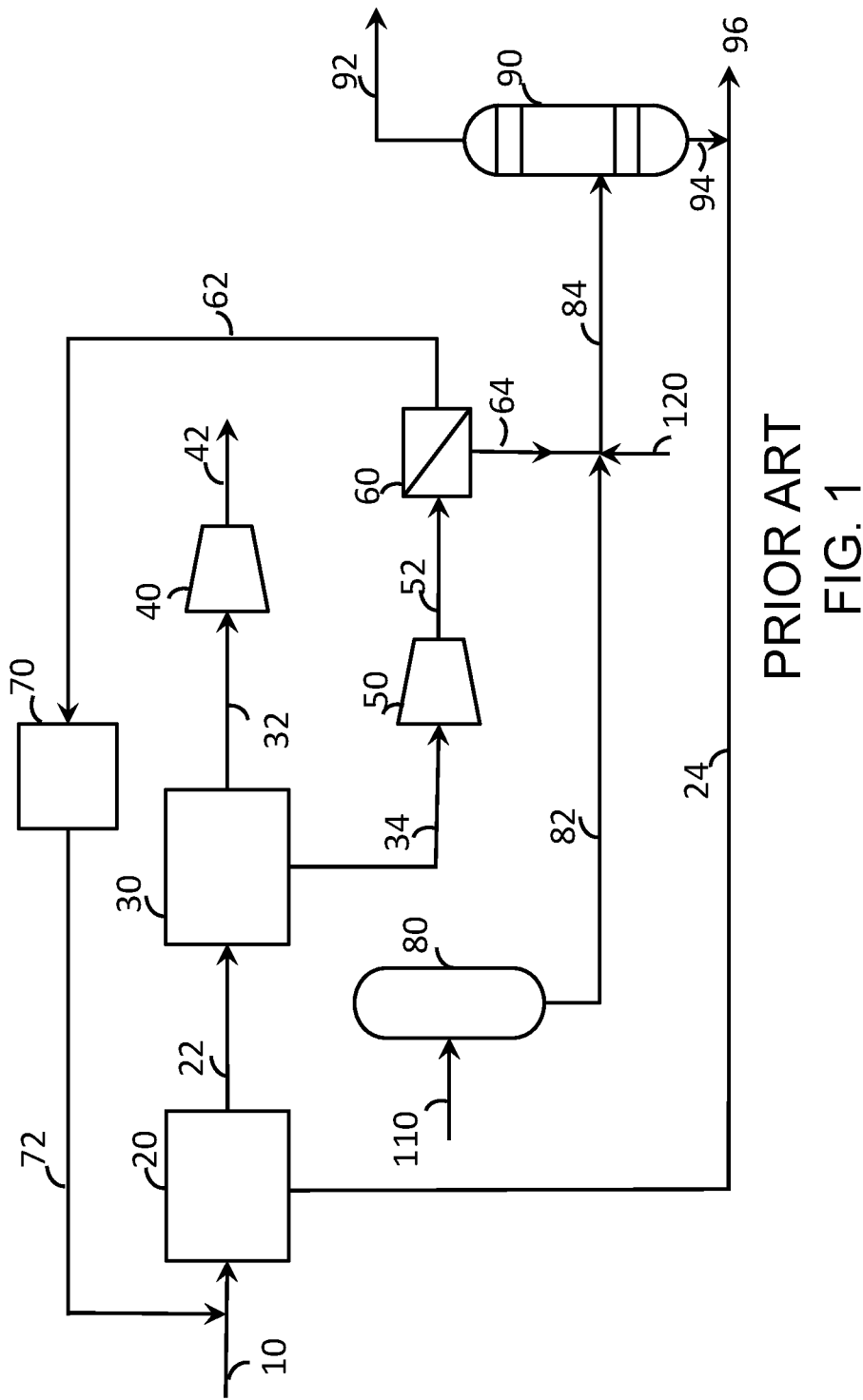
FIG. 1 is a schematic process flow diagram illustrating the prior art membrane separation process.

Skilled artisans will appreciate that elements described in FIGS. 1-5 are illustrated for simplicity and clarity and have not necessarily been drawn to scale. For example, the dimensions of some of the elements in FIGS. 1-5, may be exaggerated relative to other elements to help to improve understanding of various embodiments of the present disclosure. Also, common but well-understood elements that are useful or necessary in a commercially feasible embodiment may not be depicted in order to facilitate a less obstructed view of these various embodiments of the present disclosure.

Definitions

As used herein, the term "stream" can include various hydrocarbon molecules and other substances.

As used herein, the term "rich" can mean an amount of generally at least about 50% or at least about 70%, preferably about 90%, and optimally about 95%, by mole, of a compound or class of compounds in a stream.

As used herein the term "fluid communication" means that material flowing in between the enumerated components is in fluid state and it connects the two components.

As used herein, the term "permeate stream" can mean the product stream allowed to pass through the membranes.

As used herein, the term "non-permeate stream" can mean the retentate stream which is not allowed to pass through the membranes and remains on the membrane.

As used herein, the term "membrane" can mean a selective barrier, that allows some things to pass through it or permeate but stops others which remains as a retentate.

As used herein, the term "$C_x$" wherein "x" is an integer means a hydrocarbon stream with hydrocarbons having x carbon atoms.

As used herein, the term "$C_{x-}$" wherein "x" is an integer means a hydrocarbon stream with hydrocarbons having x and/or less carbon atoms and preferably x and less carbon atoms.

As used herein, the term "Cx+" wherein "x" is an integer means a hydrocarbon stream with hydrocarbons having x and/or more carbon atoms and preferably x and more carbon atoms.

As used herein, the term "stage-cut" can be determined as the ratio of the permeate flow rate to the membrane feed gas flow rate at a specified value.

As used herein, the term "bank" can refer to a set of each parallel membrane modules that can be fully isolated from the rest of the process.

As used herein, the term "separator" means a vessel which has an inlet and at least an overhead vapor outlet and a bottoms liquid outlet and may also have an aqueous stream outlet from a boot.

As used herein, the term "portion" means an amount or part taken or separated from a main stream without any change in the composition as compared to the main stream. Further, it also includes splitting the taken or separated portion into multiple portions where each portion retains the same composition as compared to the main stream.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description. The Figures have been simplified by the deletion of many apparatuses customarily employed in a process of this nature, such as vessel internals, temperature and pressure controls systems, flow control valves, recycle pumps, etc. which are not specifically required to illustrate the performance of the invention. Furthermore, the illustration of the process of this invention in the embodiment of a specific drawing is not intended to limit the invention to specific embodiments set out herein.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

The instant disclosure provides an efficient way to recycle hydrogen within the process that is accomplished by operating part of the tail-gas membrane cartridges at lower permeate pressure, and using this permeate as external purge gas in the PSA unit. This results in a significant reduction in total installed membrane area and a significant reduction in compression power.

An embodiment of membrane permeates recycle process is addressed and shown in FIG. 1. The flow scheme of FIG. 1 shows a net gas compression and hydrocarbon recovery system 20 to which a net gas stream 10 containing mainly hydrogen rich gas is being passed. The liquids produced after the compression and recovery are collected as heavy hydrocarbon stream in line 24 and the compressed gas in line 22 containing hydrogen and light hydrocarbons is passed to a high-pressure PSA unit 30. The PSA unit 30 delivers the hydrogen rich gas stream in line 32 to a first stage compressor 40 for further compression and the hydrogen rich gas stream is recovered in line 42. The first stage compressor 40 compresses the hydrogen rich gas stream to a pressure typically from 250-400 psia to 600-900 psia.

The first stage compressor unit 40 delivers the recovered hydrogen 42 at high purity (>99.9 mol %) which is required to be further compressed. The non-recovered hydrogen and hydrocarbon impurities are recovered as PSA tail gas in line 34 that is compressed in a PSA tail gas compressor 50 with a compressed tail gas stream in line 52 sent to a first membrane unit 60 to produce a first permeate stream in line 62 which is sent to a dryer 70. The dried gas in line 72 is recycled and mixed with the net gas feed stream in line 10. The dryer 70 may include adsorbents to remove moisture (H2O) from PSA tail gas stream in line 62.

The first non-permeate stream in line 64 from the first membrane unit 60 can be combined with other streams from a catalytic reforming unit. Reactor effluent in line 110 (from reactor, not shown) is injected into a separator unit 80 to produce a separator liquid in line 82. The separator effluent stream in line 82 is mixed with a hydroprocessing stripper off-gas stream (supplied from an external source) via line 120 and the first non-permeate stream in line 64 forming a mixed effluent stream in line 84. Further, the mixed effluent stream in line 84 is then fully supplied to an absorber unit 90 installed downstream to the first membrane unit. The absorber 90 produces a fuel gas stream taken from the top of the absorber in line 92 and a heavy hydrocarbon stream in the bottom line 94. The heavies stream in line 94 can be further treated in a depentanizer or a debutanizer of the catalytic reforming unit, to separate out pentanes and butanes, respectively.

The heavy hydrocarbon bottom stream can further be combined with another heavier hydrocarbon stream supplied in line 24 and recovered as an effluent from the net gas compressor and hydrocarbon recovery system 20 forming a mixed heavy hydrocarbon product stream in line 96. The reactor effluent stream in line 110 is recovered as a catalytic reforming effluent stream comprising hydrogen, light hydrocarbons (from C1 to C4), light naphtha (C5 to C6) and heavy naphtha (C6 to C11) range materials. Accordingly, reformate effluent stream in line 110 may be passed to the separator 80. In the separator 80, vapors may be separated to provide a reformate vapor stream (not shown) and a reformate liquid stream in line 82.

Figure 2:
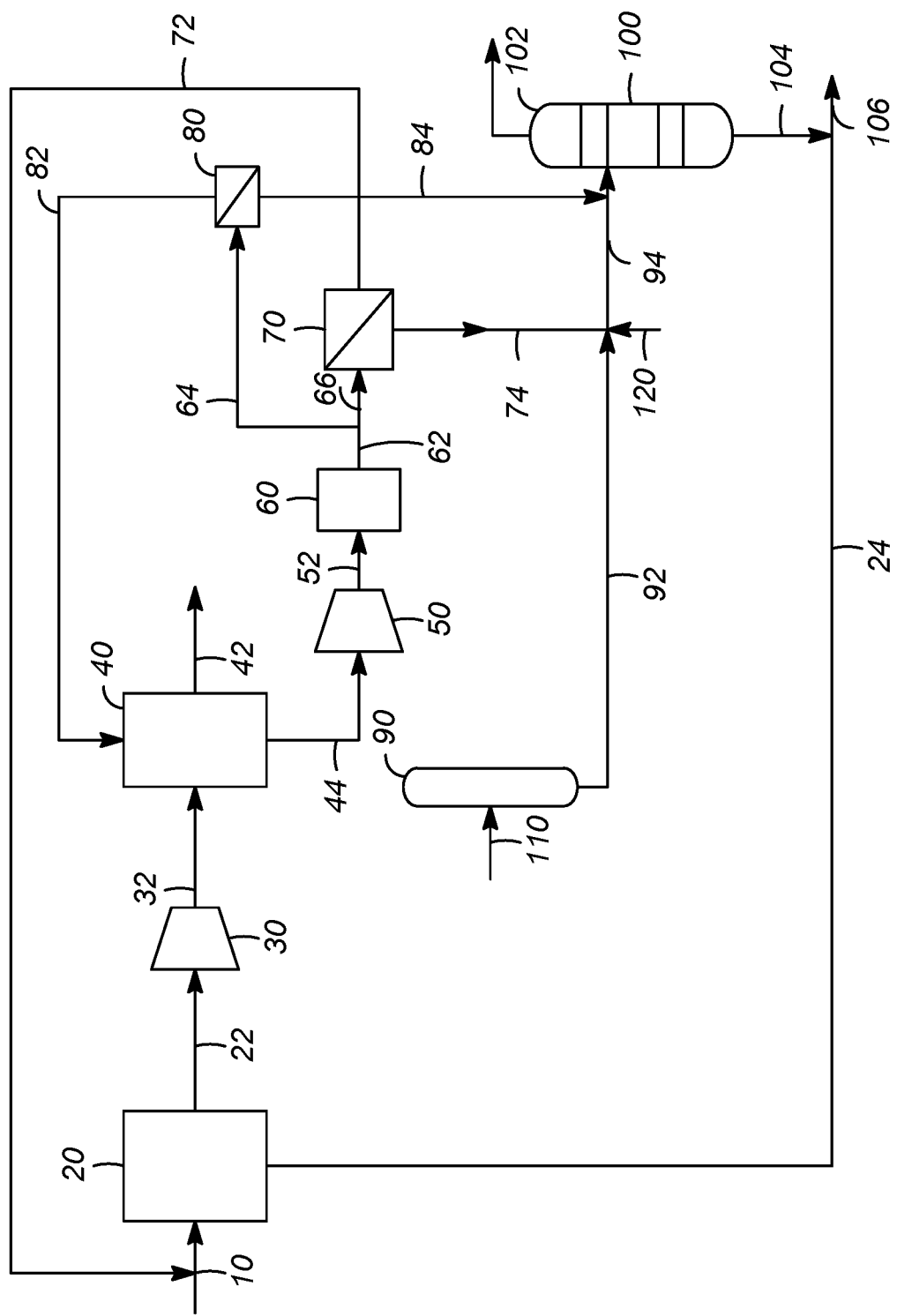
FIG. 2 is a schematic flow diagram of the process of the present disclosure illustrating the improvement in membrane permeate recycle process.

Referring now to FIG. 2, an embodiment for improved and efficient hydrogen recovery from the membrane permeates recycle process is shown. The flow scheme as shown in FIG. 2, has a benefit provided in that a part of the pressure swing adsorption (PSA) tail gas is recycled at low pressure, thereby avoiding costly re-compression and reducing the size of the recycle compressor. FIG. 2 shows the flow scheme of the present invention with a net gas stream 10 containing mainly hydrogen rich gas (major hydrogen and remaining hydrocarbons) from a catalytic reforming unit sent to a net gas compressor and hydrocarbon recovery system 20. The liquids produced after the compression and recovery are collected as heavy hydrocarbon stream in line 24. The compressed gas in line 22 containing hydrogen and light hydrocarbons, then passes to a first stage compressor 30 with a further compressed stream in line 32 sent to a high-pressure PSA unit 40.

However, there could be an alternative flow scheme (not shown here) for utilizing a PSA unit 40 operating at lower pressure which would directly pass the compressed gas in line 22 into the PSA unit 40 without the need for first stage compressor 30. Further, the compression system 30 compresses the gas in line 22 to a pressure ranging typically from 250-400 psia to 600-900 psia. The PSA unit 40 delivers the recovered hydrogen 42 at high purity (>99.9 mol %) to the consumer. The non-recovered hydrogen and hydrocarbon impurities collectively makes up the PSA tail gas stream in line 44 that is further compressed by utilizing a PSA tail gas compressor 50 and recovering a compressed tail gas stream in line 52 which is further passed on to a dryer unit 60. The compressor 50 compresses the PSA tail gas in line 44 at a pressure ranging typically from 15-25 psia to 250-350 psia.

A first portion of the dried gas in line 62 is taken in line 66 and directed to a first membrane unit 70 to produce a first permeate stream in line 72 which is recycled to and mixed with the net gas feed stream injected in line 10. A second portion of the dried gas in line 62 is taken in line 64 which is sent as a feed gas to a second membrane unit 80 to produce a second permeate stream in line 82 being recycled to the PSA unit 40. In an aspect of the present disclosure, the dryer unit 60 may also include a separator filled with adsorbents to remove moisture (H2O) from the PSA tail gas stream.

The first non-permeate stream recovered as an effluent in line 74 from the first membrane unit 70 and the second non-permeate stream recovered as effluent in line 84 from the second membrane unit 80 are combined and mixed with other streams from the catalytic reforming unit (not shown here). The reactor effluent coming in, in line 110 is injected into a separator unit 90 thereby, producing a separator liquid stream in line 92. The separator liquid stream 92 is further mixed with hydroprocessing stripper off-gas stream injected via external source in line 120 and combined with the first non-permeate stream 74 and the second non-permeate streams in line 84 to form a combined effluent stream 94 which goes to the absorber unit 100. The absorber unit 100 produces a fuel gas stream recovered at the top of the absorber from line 102 and a heavier hydrocarbon stream recovered from bottom of the absorber via line 104. The heavy hydrocarbon bottom stream 104 can be further treated in a depentanizer or a debutanizer unit of a catalytic reforming unit. Also, the heavy hydrocarbon bottom stream recovered in line 104 can be mixed with the heavier hydrocarbon stream flowing in line 24 and recovered as effluent from the net gas compressor and hydrocarbon recovery system 20. The mixed resultant stream flows in line 106. The reactor effluent stream in line 110 is recovered as a catalytic reforming effluent stream comprising hydrogen, light hydrocarbons (from $C_1$ to $C_4$), light naphtha ($C_5$ to $C_6$) and heavy naphtha ($C_6$ to $C_{11}$) range materials.

As an alternative feature either a portion of or all of the fuel gas stream in line 102 can also be recycled to the net gas compressor and hydrocarbon recovery system 20 to recover hydrogen out of the fuel gas stream ($C_{2-}$). In an aspect of the present invention, the net gas compression and hydrocarbon recovery system 20 may include a separator in fluid communication with the compressor to separate any liquid present and to pass the vapor or gas portion of the stream to the next process step or compression step. Further, coolers may also be present therein for cooling. Further, the compressor may have a maximum of two stages. The membrane feed pre-treatment section is commonly found comprising of a feed dryer, feed filter or a coalescer or a feed knock-out drum and feed flow measurement with pressure and temperature compensation. A feed heater is installed in the membrane pre-treatment section to condition the membrane feed gas temperature at a constant value.

Also, the separation of gases in the membrane separation unit takes place due to differences in relative permeation rates of hydrogen and other hydrocarbon components when a pressure difference between feed side and permeate side of a semi-permeable membrane barrier is imposed. The semi-permeable membrane barrier is contained within the membrane elements. This semi-permeable membrane barrier performs the separation and is typically, though not limited to, formed of a material selected from the group of cellulose acetate, polyimide or polysulphone, etc., showing a selectivity between permeable molecules like hydrogen and less permeable molecules such as hydrocarbons. In the improved flow scheme, as shown in FIG. 2, the part of the PSA tail gas is sent to another membrane unit rather than the single membrane unit that is used in schematics shown in FIG. 1. This membrane unit operates with a lower permeate flow draw-off and lower permeate pressure (20 psig) compared to the main tail-gas membrane (85 psig permeate pressure). Because of the lower permeate pressure, the driving force for permeation is larger. The reduced permeate pressure increases the membrane feed to permeate pressure ratio. Lowering the permeate pressure from 85 psig (100 psia) to 20 psig (35 psia) increases this ratio by a factor of almost 3 and reduces the required membrane area by a factor 3. Because the cost of membrane systems is proportional to the installed membrane area, this results in a significant cost reduction.

A further reduction in required membrane area is coming from the permeate flow draw-off. Permeate from the smaller membrane is recycled directly to the PSA unit instead of through the PSA feed re-contact and compression sections and is no longer utilized as PSA feed gas but is used instead as PSA purge gas. Hydrogen purity of this purge gas is high (about 97 mol % or higher), whereas permeate recycle from the main tail-gas membrane has a lower hydrogen purity (of about 67 mol %). The use of the recycled hydrogen as purge gas in the PSA unit permits an increased recovery of hydrogen in the PSA process as the amount of purge gas that is normally used for internal purge can now be used for pressure equalizations during co-current depressurization through further optimization of the PSA cycle equalization steps. The reduction in recycle flow rate slightly improves the PSA feed gas quality which also has a beneficial effect on the PSA unit recovery and required adsorber bed volume, both of which have a positive impact on the PSA unit cost.

The flow scheme of FIG. 2, with two membrane units can be made very flexible as the split of PSA tail gas flow rates to each of the two membranes can be optimized for any given case and is determined by operating conditions (pressure) of the process and the desired overall hydrogen recovery. In this case at a refinery, 77% of PSA tail gas goes to the smaller membrane that generates the recycle purge gas.

Figure 3:
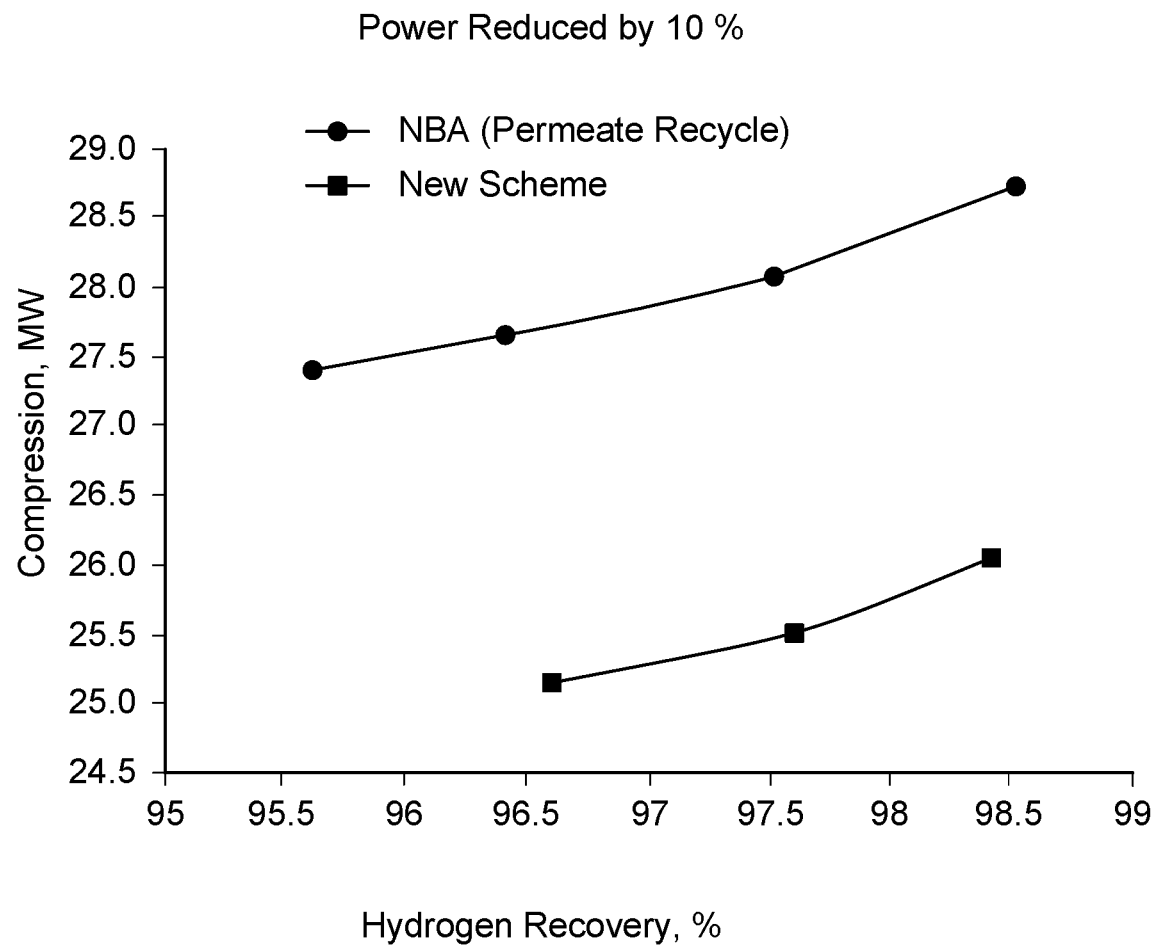
FIG. 3 illustrates a reduction in the power required to run the system of the present disclosure.

In an exemplary embodiment, the illustrative representation of the relative power requirements by the two systems have been shown. FIG. 3, depicts the relative difference in power required by the prior art system and instant disclosure. The readings shown by the upper line represents power required for operating the process as depicted in prior art FIG. 1 and the readings shown by the lower line represents the power required to carry out the instant process as per the applicants' disclosure. Further a comparison of the improved scheme with that of the prior art system, is depicted in FIG. 3 over a range of hydrogen recoveries. Results show a consistent operating benefit of ~10% lower compression power. An important aspect of this invention is related to operating pressure of the PSA unit. It was found that the benefit of using an external purge gas in the PSA cycle is greater for higher pressure ratios (feed pressure over purge pressure) in the PSA unit. PSA units operating at higher pressure can perform additional pressure equalization steps that increase the hydrogen recovery.

Further, as noted in the present invention, a PSA pressure ratio of 37 was used to maximize the efficiency of external purge. This PSA pressure ratio is determined based on the ratio of feed gas pressure to the tail gas pressure, i.e., 815 (psia)/22 (psia). To achieve this high PSA pressure ratio, the PSA feed gas is compressed and a high-pressure cycle is used to generate product hydrogen for downstream high-pressure consumers (e.g., hydrocracker).

Figure 4:
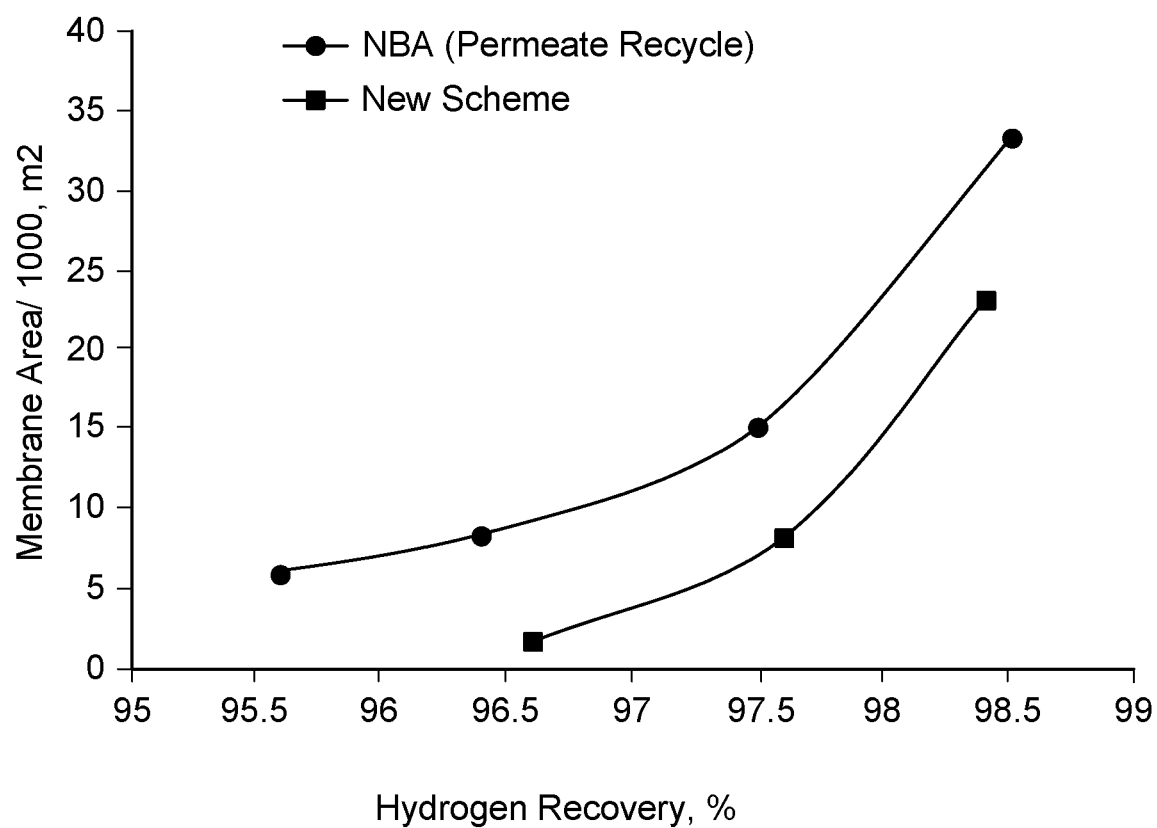
FIG. 4 illustrates the significant reduction in the membrane area as required in the present disclosure.

Referring next to FIG. 4, which shows the total membrane area required previously is shown by the upper line and the total membrane area now required by the present disclosure is shown by the lower line, with the total membrane area reduced by 1.4× to 5× times over a range of hydrogen recovery from 96.5% to 98.5%, respectively.

Figure 5:
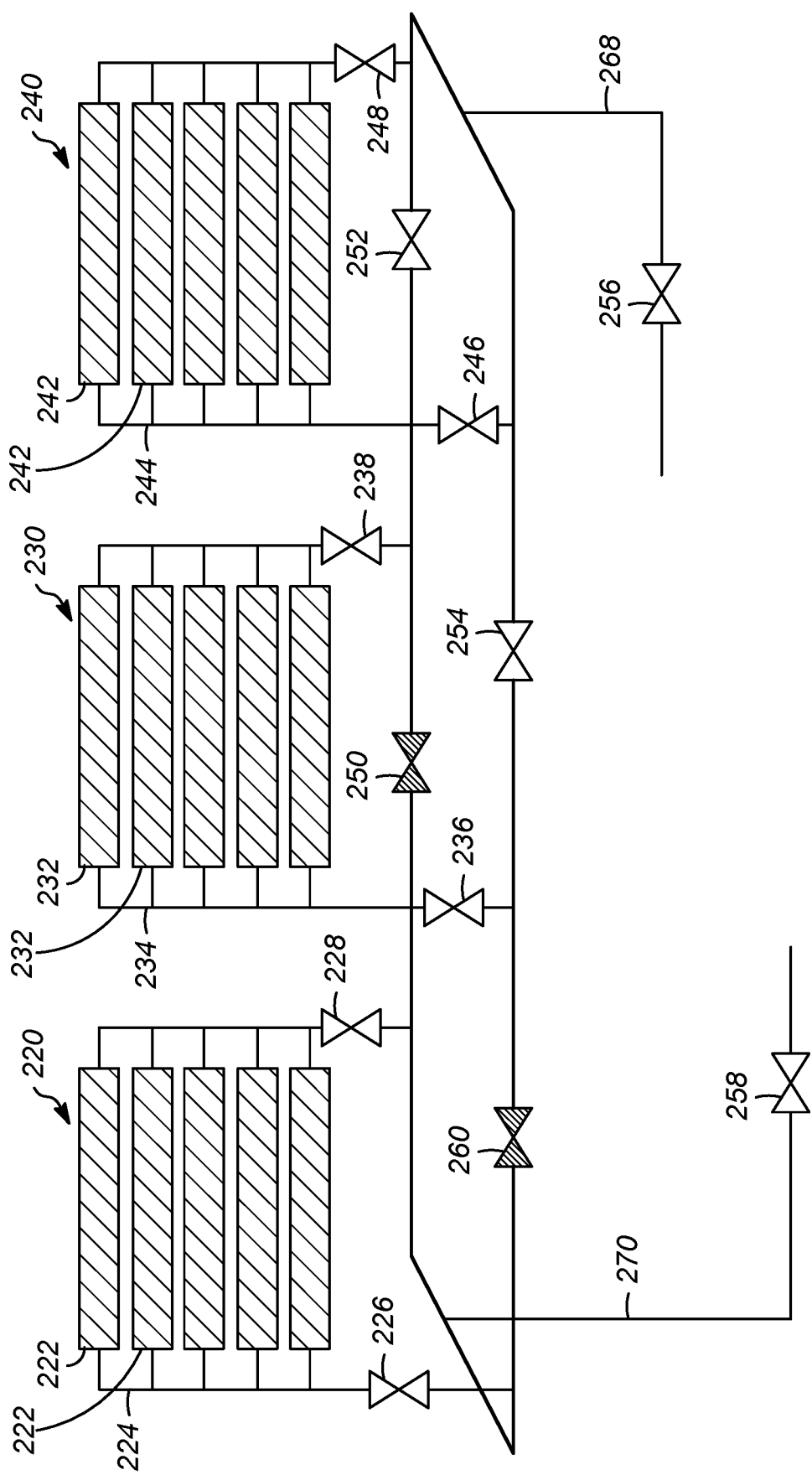
FIG. 5 is a schematic illustrating the details of the piping layout as used in the present disclosure where the two membrane units are integrated into a single membrane system.

FIG. 5 shows the piping details of the permeate section of a system that combines first membrane unit 70 and second membrane unit 80 into an integrated membrane unit still meeting the requirements of the flow scheme of FIG. 2 of this invention. Further FIG. 5 shows three membrane module banks 220, 230 and 240 that each contain individual membrane modules 222, 232, 242. Each membrane module bank can be isolated by bank isolation valves 226 and 228, 236 and 238, and 246 and 248 from the membrane permeate headers. Inside the membrane module banks 220, 230 and 240, lines 224, 234 and 244 connect the membrane modules that are installed in parallel. Segregation valves 252 and 254 are in open position, connecting banks 230 and 240 to stage 1. Segregation valves 250 and 260 are in closed position, separating bank 220 from the other banks 230 and 240 and thereby making up stage 2.

The first membrane unit operating at high permeate pressure is at stage 1 and the second membrane unit operating at low permeate pressure is at stage 2. Permeate product 270 from stage 1 and permeate product 268 from stage 2 are withdrawn at opposite ends of the permeate header. Control valve 256 controls the pressure in stage 2 in permeate line 268 while control valve 258 controls the lower pressure in stage 1 in permeate line 270.

An additional feature of the present invention is the integrated membrane units and control of the integrated membrane units into a single unit having two membrane separation sections operating at different permeate pressures. The integrated membrane unit of the present invention has at least two membrane module banks for the high permeate pressure section (stage 1) and at least two membrane module banks for the low permeate pressure section (stage 2). The banks can be of the same or of a different size, depending on the requirements of the process. The integrated membrane unit has a common feed and non-permeate section while the permeate section is split in two. The piping of the integrated membrane system has two distinct permeate destinations that are integrated into a common skid.

Since there are two permeate connections at different pressure levels, therefore, both permeate streams are withdrawn at opposite ends of the permeate main collector. For this purpose, one or more automatic segregation valves are installed in the permeate header. The valve(s) segregate the different membrane banks that make up the stage 1 and stage 2 membrane units and at the same time allow each stage to operate at its own permeate pressure level.

The invention assumes that each membrane stage has at least two banks which means that the smallest configuration of integrated system would have at least four membrane module banks. In such smallest configuration, at least a single segregation valve should be installed to separate both membrane sections. For larger membrane systems, where the stage 1 and/or stage 2 are configured to have more than two module banks, additional segregation valves can be installed. This configuration adds flexibility to the system. In the most flexible configuration, with $N_H$ banks belonging to stage 1 and $N_L$ banks belonging to stage 2, a total of $N_H+N_L-1$ segregation valves can be installed. One of these valves would be in fully closed position while the others are in open position.

This configuration permits to create a high flexibility in the system to change the flow ratio between the gas that is used as recycle gas to the PSA feed inlet (from stage 1 at high permeate pressure) and the gas that is recycled to the PSA provide purge inlet (from stage 2 at low permeate pressure). Based on the required split of external PP or the recycle gas, the position of the control valves can be modified to change the number of membrane module banks belonging to either the stage 1 or stage 2. One of the valves will be closed and segregates stage 1 from stage 2, while the other valves are open. The banks connected on the high-pressure side of the closed segregation valve make up stage 1, while the banks connected to the low-pressure side of the closed segregation valve make up stage 2. To change the ratio of membrane feed gas flowing to stage 1 and stage 2 and thus the ratio of external PP or the recycle gas, the individual stage-cut controllers of each stage can be used. For larger changes, it may be required to change the assignment of a bank of membrane modules from stage 1 to stage 2, or vice-versa.

To allow such changes without stopping the membrane system, positioners are installed on the automatic segregation valves to permit slow opening and avoid pressure shock waves between the high and low permeate pressure sides. When one bank is re-configured from one stage to the other stage, manipulation of the segregation valves at either side of the bank will permit the change in configuration. To change the bank from stage 1 (high pressure) to stage 2 (low pressure), the open segregation valve connecting the bank to stage 1 is closed first and then the closed segregation valve connecting to stage 2 is ramped open. To change the bank from stage 2 (low pressure) to stage 1 (high pressure), the open segregation valve connecting the bank to stage 2 is closed first and the closed segregation valve connecting to stage 1 is ramped open. The control system will keep the feed pressure and non-permeate pressures high and control the stage-cut of both stage 1 and stage 2 by modifying the pressure at their respective permeate sides.

Based on the specific properties of the 2 membrane sections (installed area), the control system can calculate how much gas is going to each bank from a single flow measurement and the quantity of installed membrane area in stage 1 and stage 2 and can use that information in controlling the stage cut from a single feed flow measurement instead of 2 feed flow measurements. This is a benefit in the membrane skid construction not only through the cost reduction from the lower number of instruments but also in the skid construction as less straight run piping length will be required for the flow measurements.

However, in case both membrane sections operate at same temperature, the feed heater that maintains the membrane operating temperature can be common with a common temperature control loop and temperature control valve; in case both stages would operate at different temperature a common feed heater can still be utilized but separate membrane feed temperature control loops and corresponding control valves would be required for both separation stages, or an additional (smaller) exchanger could be used for the higher of the operating temperatures. In addition, when the both stages are operating at different temperatures, segregation valves can also be added to the feed headers to direct feed gas of different temperatures to stage 1 and stage 2 separation sections, when both ends of the feed header are fed with feed gas at different temperature.

A savings in operating costs through lowered power requirements as well as a significant reduction in the size of the membrane units are accomplished while maintaining at least the same or higher production of hydrogen.

More specifically the present disclosure achieves approximately equal hydrogen and LPG recovery, by reducing the operating costs by ~10% and reducing the capital costs by ~7%. Operating costs are lowered due to reduced catalytic reforming unit net gas compression requirement (reduced recycle flow from bigger membrane) and reduced PSA tail gas compression (increased PSA recovery and reduced PSA feed gas flow). Lower capital costs are due to smaller total installed membrane area and reduced cost of compression equipment.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process of treating a net gas stream comprising sending the net gas stream to a compressor to produce a compressed gas stream; sending the compressed gas stream to a pressure swing adsorption unit to produce a hydrogen product stream and a tail gas stream; sending the tail gas stream to a first membrane unit to produce a first permeate stream and a first non-permeate stream; and sending a portion of the tail gas stream to a second membrane unit to produce a second permeate stream and a second non-permeate stream. An embodiment of the invention is one, any or all of prior embodiments in this paragraph up through the first embodiment in this paragraph, further comprising compressing the tail gas stream prior to sending the tail gas stream to the first and second membrane units. An embodiment of the invention is one, any or all of prior embodiments in this paragraph up through the first embodiment in this paragraph, wherein the first non-permeate stream and the second non-permeate stream are sent to an absorber unit to produce a fuel gas stream and a $C_{3+}$ stream. An embodiment of the invention is one, any or all of prior embodiments in this paragraph up through the first embodiment in this paragraph, further comprising a control system to control flow of the tail gas stream to the first membrane unit and the second membrane unit. An embodiment of the invention is one, any or all of prior embodiments in this paragraph up through the first embodiment in this paragraph, wherein the second permeate stream from the second membrane unit is recycled to the pressure swing adsorption unit as purge gas. An embodiment of the invention is one, any or all of prior embodiments in this paragraph up through the first embodiment in this paragraph, wherein the first membrane unit and the second membrane unit operate at same temperatures. An embodiment of the invention is one, any or all of prior embodiments in this paragraph up through the first embodiment in this paragraph, wherein the first membrane unit and the second membrane unit operate at a different temperature. An embodiment of the invention is one, any or all of prior embodiments in this paragraph up through the first embodiment in this paragraph, wherein the control system controls permeate pressure of the first membrane unit and the second membrane unit by controlling a ratio of permeate flow to membrane feed flow for the first membrane unit and the second membrane unit. An embodiment of the invention is one, any or all of prior embodiments in this paragraph up through the first embodiment in this paragraph, wherein the control system measures an amount of flow of gas to each bank of membranes within each of the first membrane unit and the second membrane unit. An embodiment of the invention is one, any or all of prior embodiments in this paragraph up through the first embodiment in this paragraph, wherein the control system is combined with the control system for the pressure swing adsorption unit. An embodiment of the invention is one, any or all of prior embodiments in this paragraph up through the first embodiment in this paragraph, wherein the control system for the membranes units is separate from a control unit for the pressure swing adsorption unit. An embodiment of the invention is one, any or all of prior embodiments in this paragraph up through the first embodiment in this paragraph, wherein the control system combines the measure of the amount of flow of gas into a single value to control an amount of gas sent to the second membrane unit. An embodiment of the invention is one, any or all of prior embodiments in this paragraph up through the first embodiment in this paragraph, combining the first membrane unit and the second membrane unit further comprises segregation valves with positioners to permit slow opening of valves keeping away pressure shock waves. An embodiment of the invention is one, any or all of prior embodiments in this paragraph up through the first embodiment in this paragraph, wherein at least one bank of membrane units is at a lower pressure than at least one bank of membrane units. An embodiment of the invention is one, any or all of prior embodiments in this paragraph up through the first embodiment in this paragraph, wherein the first membrane unit and the second membrane unit each comprise at least two banks. An embodiment of the invention is one, any or all of prior embodiments in this paragraph up through the first embodiment in this paragraph, wherein the first membrane unit and the second membrane unit each comprise a different membrane polymer. An embodiment of the invention is one, any or all of prior embodiments in this paragraph up through the first embodiment in this paragraph, wherein the pressure swing adsorption unit comprises a protective adsorbent layer at a hydrogen product end of an adsorber bed to remove impurities from the second membrane permeate stream. An embodiment of the invention is one, any or all of prior embodiments in this paragraph up through the first embodiment in this paragraph, further comprising at least one of sensing at least one parameter of the process and generating a signal or data from the sensing; generating and transmitting a signal; or generating and transmitting data.

A second embodiment of the invention is a process of treating a net gas stream comprising sending the net gas stream to a compressor to produce a compressed gas stream; sending the compressed gas stream to a pressure swing adsorption unit to produce a hydrogen product stream and a tail gas stream; sending the tail gas stream to a first membrane unit to produce a first permeate stream and a first non-permeate stream; sending a portion of the tail gas stream to a second membrane unit to produce a second permeate stream and a second non-permeate stream; controlling a flow of the tail gas stream to the first membrane unit and the second membrane unit. An embodiment of the invention is one, any or all of prior embodiments in this paragraph up through the second embodiment in this paragraph, further comprising a controls system that controls permeate pressure of the first membrane unit and the second membrane unit by controlling a ratio of permeate flow to membrane feed flow for the first membrane unit and the second membrane unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process of treating a net gas stream comprising:
sending the net gas stream to a compressor to produce a compressed gas stream;
sending the compressed gas stream to a pressure swing adsorption unit to produce a hydrogen product stream and a tail gas stream;
sending a portion of the tail gas stream to a first membrane unit to produce a first permeate stream and a first non-permeate stream;
sending a portion of the tail gas stream to a second membrane unit to produce a second permeate stream and a second non-permeate stream; and
passing the second permeate stream without further compression to the pressure swing adsorption unit,
wherein the first membrane unit and the second membrane unit are selective for hydrogen,
and wherein the second permeate stream from the second membrane unit is recycled to the pressure swing adsorption unit as purge gas.

2. The process of claim 1, further comprising compressing the tail gas stream prior to sending the tail gas stream to the first and second membrane units.

3. The process of claim 1, wherein the first non-permeate stream and the second non-permeate stream are sent to an absorber unit to produce a fuel gas stream and a $C_{3+}$ stream.

4. The process of claim 1, further comprising a control system to control flow of the tail gas stream to the first membrane unit and the second membrane unit.

5. The process of claim 1, wherein the first membrane unit and the second membrane unit operate at same temperatures.

6. The process of claim 1, wherein the first membrane unit and the second membrane unit operate at a different temperature.

7. The process of claim 4, wherein the control system controls permeate pressure of the first membrane unit and the second membrane unit by controlling a ratio of permeate flow to membrane feed flow for the first membrane unit and the second membrane unit.

8. The process of claim 4, wherein the control system measures an amount of flow of gas to a bank of membranes within each of the first membrane unit and the second membrane unit.

9. The process of claim 4, wherein the control system is combined with a control system for the pressure swing adsorption unit.

10. The process of claim 4, wherein the control system for the membranes units is separate from a control unit for the pressure swing adsorption unit.

11. The process of claim 8, wherein the control system combines the measure of the amount of flow of gas into a single value to control an amount of gas sent to the second membrane unit.

12. The process of claim 11, wherein further comprising combining the first membrane unit and the second membrane unit via segregation valves having positioners permitting slow opening of valves keeping away pressure shock waves.

13. The process of claim 1, wherein the first membrane unit and the second membrane unit each comprise at least two banks.

14. The process of claim 1, wherein the first membrane unit and the second membrane unit each comprise a different membrane polymer.

15. The process of claim 1, wherein the pressure swing adsorption unit comprises a protective adsorbent layer at a hydrogen product end of an adsorber bed to remove impurities from the second membrane permeate stream.

16. A process of treating a net gas stream comprising:
sending the net gas stream to a compressor to produce a compressed gas stream;
sending the compressed gas stream to a pressure swing adsorption unit to produce a hydrogen product stream and a tail gas stream;
sending a portion of the tail gas stream to a first membrane unit to produce a first permeate stream and a first non-permeate stream;
sending a portion of the tail gas stream to a second membrane unit to produce a second permeate stream and a second non-permeate stream;

passing the second permeate stream without further compression to the pressure swing adsorption unit; and controlling a flow of the tail gas stream to the first membrane unit and the second membrane unit, wherein the first membrane unit and the second membrane unit are selective for hydrogen.

17. The process of claim 16, further comprising a controls system that controls permeate pressure of the first membrane unit and the second membrane unit by controlling a ratio of permeate flow to membrane feed flow for the first membrane unit and the second membrane unit.

18. The process of claim 13, wherein at least one bank of membrane units is at a lower pressure than at least one bank of membrane units.

* * * * *